2,795,587

PROCESS FOR PRODUCING COPPER-PHTHALO-CYANINE PRECURSOR

Melvin A. Perkins, Brandywine Hundred, Del., assignor to E. I. du Pont de Nemours and Company, Wilmington, Del., a corporation of Delaware No Drawing. Application May 11, 1956,
Serial No. 584,199

4 Claims. (Cl. 260—314.5)

This invention relates to a novel process for preparing copper-phthalocyanine precursor.

In copending application of Barnhart and Skiles, Serial No. 252,401 (now Patent No. 2,772,284), a novel, solvent-soluble complex compound is described which has no tinctorial qualities by itself, but which possesses the valuable property of yielding copper phthalocyanine upon heating or upon being treated with reducing agents. By virtue of this property, the compound may be used as a dyestuff for textile material, to be applied thereto from an alcoholic or aqueous-alcoholic bath and to be developed on the fiber by heating or reduction. The composition of this novel compound is indicated there as corresponding to a complex made up of 6 phthalonitrile units, one atom of copper and an extra NH unit. Accordingly, it may be represented by the formula $Cu(C_8H_4N_2)_6NH$, wherein the $C_8H_4N_2$ unit has the structural form

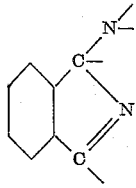

This novel complex compound has been designated in said application of Barnhart and Skiles as leuco-copper phthalocyanine. Subsequent usage however has adopted for it the name copper-phthalocyanine precursor. When this compound is converted into copper phthalocyanine by treatment with reducing agents, the remaining two $C_8H_4N_2$ units and the extra NH group are split off in the form of ammonia and phthalonitrile or other phthalic compounds resulting from the interaction of phthalonitrile, ammonia and the reducing medium.

According to said copending application Serial No. 252,401 (now Patent No. 2,772,284), as improved by the copending application of A. C. Stevenson, Serial No. 384,349 (now Patent No. 2,772,283), this complex compound is synthesized by reacting phthalonitrile, a cupric salt and ammonia at a temperature between 55° and 98° C. in a water-miscible, neutral organic solvent and in the presence of a catalyst, while feeding into the reaction mass diluted gaseous oxygen, for instance air or a mixture of air and ammonia. The cupric salt may be anhydrous or hydrated and may be selected, for instance, from the following group: cupric chloride or its dihydrate; cupric bromide; cupric sulfate and its monohydrate or pentahydrate; cupric nitrate trihydrate; cupric acetate and its monohydrate. If an anhydrous salt is employed, the organic solvent may contain water up to 10% of its weight.

As solvents for the above purpose, the following organic liquids have been indicated: alcoholic solvents such as methanol or ethanol, the lower monoalkyl ethers of ethylene glycol (the "Cellosolves"); the lower monoalkyl ethers of diethylene glycol (the "Carbitols"); and neutral liquid amides such as dimethyl formamide and dimethyl acetamide. As catalysts, nitrogenous organic compounds have been named, particularly urea, biuret, guanidine, methyl glucamine, iminophthalimidine and 1,3-diimino-isoindoline.

In copending application of Perkins and Whelen, Serial No. 430,400 (now Patent No. 2,782,207), it has been indicated that liquid or solid oxidizing agents may be employed in lieu of oxygen in gaseous form. As particular illustrations of suitable oxidizing agents have been named the alkali-metal nitrites, nitrates, ferricyanides, nitrobenzene sulfonates and 2-anthraquinone sulfonates; also calcium hypochlorite, hydrogen peroxide, mercuric oxide and aromatic nitrohydrocarbons, such as nitrobenzene, the various mononitrotoluenes, nitroxylenes and nitronaphthalenes.

Best results are obtained by starting with essentially stoichiometric proportions, that is, about 6 moles of the phthalonitrile for each mole of cupric salt, but moderate variation in this respect is permissible, say from 3.5 to 7 moles of phthalonitrile for each mole of cupric salt.

In all cases above, the reaction product may be isolated directly in amorphous form or it may be transformed into a moisture-stable, crystalline form by slurrying an aqueous filter cake of the same in methanol, then filtering off and drying at a temperature not exceeding 60° C. (Copending application of M. S. Whelen, Serial No. 423,278.)

I have now found that copper-phthalocyanine precursor can be prepared in excellent yield and purity according to any of the procedures or improvements above indicated but employing as solvent an organic sulfoxide compound. As particular illustrations of such compounds may be named dimethyl sulfoxide, diethyl sulfoxide, methyl-ethyl sulfoxide, and tetramethylene sulfoxide. This result was unforeseen and constitutes a valuable practical discovery, because it has been recognized heretofore that the range of solvents applicable to the above reactions is limited essentially to those named in the aforegoing specifications. For instance, pyridine, tetramethylene sulfone and acetone, which are also water-soluble and which are generally considered as equivalent to the alcohols and "Cellosolves" for most practical purposes, are decidedly inoperative in the synthesis of copper-phthalocyanine precursor.

Apart from this detail as to solvent, the synthesis in this invention may proceed according to any of the details set forth in the aforegoing applications, and may involve any of the after treatments or improvements indicated therein.

Without limiting this invention, the following examples are given to illustrate my preferred mode of operation. Parts mentioned are by weight.

Example 1

(a) Ammonia is passed into a mixture of 138 parts of dimethyl sulfoxide and 20.5 parts of copper sulfate monohydrate for 2 hours at a temperature of 25 to 40° C. To the mixture is then added 64 parts of phthalonitrile and 4 parts of methylglucamine, and the reaction mass is agitated at 85 to 89° C. for 1.5 to 2 hours while a slow stream of air is passed in. The stream of air is regulated so as to pass a total of 6.5 parts by weight of air thru the reaction mass in the indicated period. The mixture is then filtered hot to remove copper phthalocyanine, and the filter cake is washed with a little dimethyl sulfoxide. The filtrate is drowned in water and the light tan solid formed is recovered by filtration. The solid is washed with water and dried to give an excellent yield of copper-phthalocyanine precursor.

The product can be applied to cellulosic fibers by the methods described in said Barnhart and Skiles application, Serial No. 252,401, or in the copending application of C. F. Miller, Serial No. 412,959, to produce fast, copper phthalocyanine blue shades.

(b) When part (a) is repeated, except that the amount of copper sulfate monohydrate is reduced from 20.5 to 13.2 parts, similar results are obtained.

*Example 2*

The product of Example 1 is obtained in a similar yield by replacing dimethyl sulfoxide with an equal weight of tetramethylene sulfoxide:

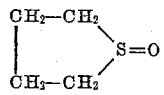

*Example 3*

A stream of ammonia is passed for 1 hour at 25 to 40° C. into a mixture of 29 parts of methyl ethyl sulfoxide and 4.3 parts of copper sulfate monohydrate. To this solution is added 13.4 parts of phthalonitrile and 0.8 part of methylglucamine. The resulting mixture is agitated at 85 to 90° C. for 1.2 hours while a slow stream of air is passed in. The stream of air is regulated so as to pass a total of 1.3 parts by weight of air thru the reaction mass in the indicated period. The reaction mass is filtered and the filtrate is drowned in water. The solid is recovered by filtration, washed with water and dried, to give the same tan colored product obtained in Example 1. It dyes cotton (by the above mentioned methods) a deep phthalocyanine blue.

*Example 4*

A mixture of 26 parts diethyl sulfoxide and 3.9 parts of copper sulfate monohydrate is gassed with ammonia for 1 hour at 25 to 40° C. To it is then added 12.1 parts of phthalonitrile and 0.8 part of methylglucamine. The mixture is agitated, at 85 to 90° C. for 1 hour while a slow stream of air is passed into it as in Example 3. The precursor which forms is isolated by the method described in Example 1.

*Example 5*

When the copper sulfate monohydrate of Example 1 is replaced with 11.3 parts of anhydrous cupric chloride and the procedure of Example 1 is followed, an excellent yield of the copper phthalocyanine precursor is obtained.

*Example 6*

The procedure of Example 1(a) is repeated in all detail down to the point where the reaction mixture is filtered hot to remove copper phthalocyanine and the filter cake is washed with dimethyl sulfoxide. The combined filtrate and washings are then drowned in 1000 parts of water and the precipitated solid is recovered by filtration. The solid is washed with water and the filter cake is then slurried in an equal weight of methyl alcohol at room temperature for 1 hour. The solid is filtered off and dried at room temperature to give an excellent yield of the copper phthalocyanine precursor in crystalline form.

It will be understood that the crystallizing procedure of Example 6 may be applied also to any of the other examples hereinabove.

In lieu of the cupric salt named in each particular example above, any other cupric salt of the group above indicated may be employed. The catalysts and the stream of air may likewise be replaced by their equivalents hereinabove indicated. Other variations in details of procedure, in the light of the several copending applications hereinabove named, will be readily apparent to those skilled in the art.

I claim as my invention:

1. A process for producing copper-phthalocyanine precursor, which comprises heating phthalonitrile, a cupric salt and ammonia in a water-miscible organic solvent at a temperature between 55° and 98° C., in the presence of a catalyst and of an oxidizing agent; said catalyst being a nitrogenous organic compound selected from the group consisting of urea, biuret, guanidine, methylglucamine, iminophthalimidine and 1,3-diimino-isoindoline; said oxidizing agent being inert toward the solvent employed; the proportion of phthalonitrile to cupric salt being from 3.5 to 7 moles of the former for each mole of the latter; and the solvent being a water-miscible, neutral, organic, liquid sulfoxide.

2. A process as in claim 1, the solvent being an organic liquid sulfoxide selected from the group consisting of dimethyl sulfoxide, diethyl sulfoxide, methylethyl sulfoxide and tetramethylene sulfoxide.

3. A process as in claim 2, the reaction product being precipitated by drowning the reaction mass in water.

4. A process as in claim 2, recovery of the reaction product being effected by removing from the reaction mass insoluble impurities, drowning the resulting clear solution in water, filtering, and converting the filter cake into a crystalline form by slurrying with methanol.

No references cited.